| | | |
|---|---|---|
| United States Patent [19] | [11] | 4,380,495 |
| Maher | [45] | Apr. 19, 1983 |

[54] METHOD OF TREATING SPRAY PAINT COLLECTION WATER IN PAINT SPRAY BOOTHS AND COMPOSITION THEREFOR

[76] Inventor: Donald R. Maher, 130 Northdale Dr., Toledo, Ohio 43612

[21] Appl. No.: 331,185

[22] Filed: Dec. 16, 1981

[51] Int. Cl.$^3$ .......................... C08L 5/00; C02F 1/56
[52] U.S. Cl. .................................... 210/728; 106/209; 210/730
[58] Field of Search .............. 210/704, 724, 730, 725, 210/731, 728; 55/84, 85; 106/209, 287.35, 206; 134/38

[56] References Cited

U.S. PATENT DOCUMENTS

| | | | |
|---|---|---|---|
| 2,026,873 | 1/1936 | Dux | 106/206 |
| 2,086,514 | 7/1937 | Saunders et al. | 106/287.35 |
| 2,208,646 | 7/1940 | Saunders et al. | 106/287.35 |
| 2,208,647 | 7/1940 | Saunders et al. | 106/287.35 |
| 2,267,426 | 12/1941 | Saunders et al. | 106/287.35 |
| 2,585,407 | 2/1952 | Rives | 106/287.35 |
| 2,978,344 | 4/1961 | Parker et al. | 106/287.35 |
| 2,982,723 | 5/1961 | Arnold et al. | 106/287.35 |
| 3,173,879 | 3/1965 | Arnold et al. | 106/287.35 |
| 3,861,877 | 1/1975 | Forney | 55/85 |
| 4,017,324 | 4/1977 | Eggers | 501/148 |
| 4,055,404 | 10/1977 | Daimer | 55/85 |
| 4,067,806 | 1/1978 | Mauceri | 134/38 |
| 4,090,001 | 5/1978 | Maillard et al. | 134/38 |
| 4,125,476 | 11/1978 | Dean | 427/331 |
| 4,130,674 | 12/1978 | Roberts et al. | 427/331 |
| 4,185,970 | 1/1980 | Dean | 55/84 |

OTHER PUBLICATIONS

Kirk-Othmer, Encyclopedia of Chemical Technology, vol. 10, pp. 746, 747, Jan. 4, 1967.

Primary Examiner—Theodore Morris
Attorney, Agent, or Firm—Paul F. Stutz

[57] ABSTRACT

Spray paint overspray is collected in an aqueous bath containing a composition inclusive of finely divided clays, oils, a rubbery material in solution or suspension, and a foam suppressant; the ingredients serving to coat the paint particles converting them to a sponge-like mass which is filterable and at the same time serving to coat metal components in such fashion that paint does not become secured there to but rather may be quite readily removed.

10 Claims, No Drawings

METHOD OF TREATING SPRAY PAINT COLLECTION WATER IN PAINT SPRAY BOOTHS AND COMPOSITION THEREFOR

The present invention relates generally to the operation and maintenance of paint spray booths and certain compositions useful therein.

The application of paint as a decorative and or protective coating onto a variety of substrates is accomplished in many industries by the use of spray guns. These spray guns by whatever means e.g. mechanical vibration, compressed air or electrostatics, convert the paint, which has been reduced to an appropriate viscosity by a compatible thinner, to a mist or fog or multiplicity of droplets, which are propelled onto the surface or attracted to the surface upon which paint deposition is desired.

Since the spray, mist or the like is incompletely directional and to an extent random, the surrounding area and atmosphere becomes polluted with the paint overspray mist while the surfaces of equipment, other than that desired to be painted, become repeatedly coated, leading to thick build ups which are difficult to remove. It is a common practice to have the parts, with surfaces to be painted, moved by a conveyor or the like through a paint spray booth to alleviate the problem of the paint overspray, and pollution of the atmosphere. The booths are essentially closed or isolated chambers with an entry and exit opening for the conveyor born parts or articles together with a spray gun station and a suitable fans or blowers and the like which provide a essentially constant flow of air leading away from the personnel occupied zones of the facility and toward and through a curtain of water at the rear of the booth. The curtain of water interrupts the directional air flow carrying the particles or mist of paint such that the paint overspray or a considerable proportion thereof becomes caught or trapped in the water bath, which is constantly recirculated and filtered of the paint residue. The combination of air flow and water curtain tends to alleviate the personnel and atmospheric problems associated with the spray painting but at the same time, there is created problems of paint particle build up in the water and coating of surfaces of auxiliary and ancillary equipment constituting a part of the overall operation.

Historically, a variety of techniques have been utilized to meet the problem of accumulated paint particles carried in a waterbath and to collect paint overspray. Caustic substances and substances producing a high pH have been used to in effect "kill" the paint particles. This method was with time, effective and satisfactory and was believed to involve the formation of a bubble by reaction of the caustic with the paint which bubble then surfaced where the plurality of bubbles containing paint particles were skimmed off and disposed of.

Unfortunately the paints in use for the past few years have become so sophisticated in formulation that the caustic techniques are ineffective. Not that the caustic technique was without its drawbacks since the heavily caustic water invited or produced its own set of problems in terms of those normally associated with handling of caustic baths etc. Paints in use today include solvents which are very low in evaporative properties and at the same time, the newer paints are waterbased, feature heavy film particle and include dispersion promoting convenience such that they are no longer effectively removed by the use of the caustic technique.

Previous techniques for treating and removing paint overspray are described in U.S. Pat. Nos. 2,086,514; 2,362,946; 2,086,367; 2,208,646; 2,208,647; 2,267,426; and 2,362,946. These techniques are not known to be commercially practiced and in any event my system and composition as set forth herein, are believed to be commercially more advantageous and possessed of greater number and/or combination of desirable features as well as improved effectiveness in accomplishing removal of the paint overspray from surfaces and as well, and more efficient and easier removal of the treated paint particles from the water bath.

It is accordingly an object of the present invention to provide a treatment system for addition to the water bath used in spray paint booths and the like.

It is a principal object of the present invention to provide a composition composed of a plurality of selected ingredients which are capable of being existent in a highly concentrated but aqueous form and being dilutable by a factor of as much as 250 to 1, yet retain the power or ability to achieve effective neutralization and advantageous and desirable removal of the paint overspray particles.

It is additionally an object of the present invention to provide such a treatment and composition therefor which is essentially neutral in pH alleviating equipment problems formerly associated with the use of caustics.

It is yet another object of the present invention to provide such a treatment system and composition therefor which so treats the spray paint overspray mist particles, such that they become converted into a nontacky substance which is easily and conveniently removed from the water bath, with a minimum of problems in downstream processing, filtering and the like.

It is also an object of the present invention to provide a treatment and composition therefor which while providing the previously enumerated advantages, also seemingly coats all metal surfaces in the spray booth areas and effectively protects them from secure attachment and subsequent build up of the paint upon the metal surface.

The foregoing as well as other objects of the present invention, will become apparent to those skilled in the art from the following more detailed description of the invention taken in conjunction with the recitation of other compositional examples.

As indicated, the treatment of my invention principally envisions the preparation of an aqueous concentrate containing a plurality of proportionally preselected ingredients by weight. The largest ingredient, of course, is the carrier or vehicle namely water. The principal active ingredient is finely divided clay, principally characterized as hydrous aluminum silicate having the formulation $Al_2O_3 \cdot 2SiO_2 \cdot 2H_2O$.

Of these it is preferred to employ a product of Georgia Kaolin Company of Elizabeth, New Jersey, composed of 38.38 percent $Al_2O_3$, forty-five percent $SiO_2$, 1.44 percent $TiO_2$, 0.25 percent $MgO$, and smaller amounts of sodium, potassium and calcium oxide together with 0.03 percent of iron oxide. Most desirably there is employed a grade of Kaolin in which 62 percent has a typical particle size of two microns or finer, thusly, having the appearance of being pulverized, at the same time, having a minimum of not more than about 0.3 percent retained on a 325 mesh screen. This particular Kaolin in water yields a pH of in the range of 4.5 to 6.5. Ideally a minor proportion of the clay should be composed of a hydrous aluminum silicate marketed by I.M.C. Foundry Products of Detroit, Michigan, under the tradename of Black Hills Bentonite having a typical analysis of 61.37 percent of silica, $SiO_2$; 21.35 percent alumina, $Al_2O_3$; 3.1 percent of iron oxide, $Fe_2O_3$; 2.65 percent magnesia MgO and 2.39 percent soda $Na_2O$. A particularly desirable product is so composed that 80 to 87 percent thereof has a particle size of minus 200 mesh, and is accordingly of a pulverized or powdery appearance. In addition to the combination of clays, my treatment composition includes a relatively minor proportion of Karaya gums which are gelatinous substances. My preferred composition additionally includes from a trace to a significant amount of water soluble oil. And lastly my composition contains a foam suppressant to avoid or reduce the amount of foam in the water bath system. Suitable foam suppressants include U.S. Movidyn End Foam; a commercially available compound.

EXAMPLE 1

To prepare a 190 gallon batch of the composition of the invention, I combined the following ingredients:
  700 pounds of Kaolin clay (grade SAF)
  25 pounds of Black Hills Bentonite (grade BH-200)
  3.5 pounds of gum Karaya
  15 gallons of a water soluble oil
  ½ gallon of foam suppressant
  1 quart sodium nitrite slurry (pH to +7.5)
  Balance $H_2O$, sufficient to form total of 190 gallons.

Firstly, I add to a vessel, adequate and marked to contain 190 gallons of water, approximately 85 gallons of water. To this, I add, while stirring, 350 pounds of the Kaolin clay and 12½ pounds of the Bentonite clay to form a slurry. Next, I add the liquid gum Karaya and, following additional stirring, there is added the remaining 350 pounds (making 700 pounds total) of the Kaolin clay, the remaining 12½ pounds of the Bentonite and one (1) quart of sodium nitrite slurry. Finally, I add about fifteen (15) gallons of a water soluble oil, marketed under the name Sun Seco, by the Sun Oil Company, one-half (½) gallon of foam suppressant, namely U.S. Movidyn End Foam and additional water sufficient (usually 30-40 gallons) to fill to the 190 gallon mark. Stirring or mixing is continued to put the ingredients into an essentially homogenized suspension, such that each volume of water contains the same proportionate amount of ingredients.

EXAMPLE 2

To prepare a 190 gallon batch of a variant composition of the invention, I combined the following ingredients:
  700 pounds of Kaolin clay (grade SAF)
  25 pounds of Black Hills Bentonite (grade BH-200)
  3.5 pounds of gum Karaya
  ½ gallon of foam suppressant
  1 quart sodium nitrite slurry (pH to +7.5)
  Balance $H_2O$, sufficient to form total of 190 gallons.
  The same procedure as in Example 1 is followed except for the addition of the water soluble oil.

To use the slurry-suspension concentrate in the spray painting equipment; the user dilutes the aqueous concentrate product in the proportion of four (4) gallons of batch concentrate to one thousand (1000) gallons of water. An appropriate amount of concentrate is added, in this proportion, to the amount of water necessary to make up a circulating water system for the particular installation.

Operating experience with the composition of this invention, in the proportions of one (1) gallon of concentrate to 225 to 275 gallons of water and maintenance of a pH between 7.5 and 8.5, finds definitely desirable results measured in terms of effective removal of the paint particles generally with automatic filtering devices. Almost without exception, the paint particles are converted to a nontacky, sponge-like mass, removed by the conventional automatic filtering devices, conveniently and advantageously, with no significant or appreciable build-up on the filter screens that can't be conveniently removed, thereby eliminating costly replacement of the screens and down time due to build-up of paint on the screens.

Experience also finds that the treatment composition of the present invention results in alleviation of any build-up of any accumulated paint on metal surfaces of auxiliary equipment of the spray painting equipment and associated metal structures, panels, support members and the like.

The use of the composition and treatment, in accordance with the present invention, is easily accomplished requiring a minimum of observation and monitoring. As previously indicated, a control of the pH so as to fall between 7.5 and 8.5 yields good result. Such pH is maintained by routine additions of 10 to 20 percent of the initial charge. In other words, if two 55 gallon drums are necessary to provide the dilution factor of four gallons of concentrate to 1000 gallons of water in the particular system, than normal operation will find a 10 to 20 gallons recharge of concentrate, after about a week of conventional operation, will bring any observed lower pH back to the range desired of 7.5 to 8.5. Experience further suggests that in the event the overspray particles show a tendency to change their character from a sponge-like, nontacky mass to the development of a slight tackiness, then additional concentration should be added. In the event that significant tackiness is observed that an amount equal to 50 percent of the initial charge should be added to the circulating water bath system to bring the bath to the desirable pH range and thereby eliminate the tackiness of the paint overspray particles as formed in the bath.

In accordance with a preferred embodiment of the present invention, the aqueous concentrate composition of the present invention, in addition to an amount of hydrous aluminum sylicate, such as Kaolin includes from about 1.5 to 6.0 and preferably 3.5 percent of sodium bentonite containing on a weight basis approximately 61 percent silicon dioxide and 21 percent aluminum oxide, with less than 5 percent individually of iron oxide, magnesium oxide and less than 1 percent calcium oxide. The latter, known as Black Hills Bentonite is different from the southern Bentonite in the presence of sodium ions as contrasted with the calcium ions present in the southern Bentonite. While the role of the presence of predominantly sodium ions in the preferred composition containing sodium bentonite (Black Hills), is not known with certainty; it is suspected that the sodium ions contribute in a manner not completely understood to achievement of improved results, primarily in the extended longevity without necessity of recharging and greater amount of paint overspray being handled by a given weight or charge of the aqueous concentrate composition of the present invention.

While it is not intended to be bound by any theory as expressed herein, it is suspected that the improvements effected by the presence of Bentonite in addition to Kaolin are attributable either to its higher molecular weight or to the presence of a higher concentration, or contribution of a higher amount, of sodium ions to the resulting bath. Bentonite also has a higher weight percent of silicon dioxide that the Kaolin, and this may also contribute to the improvements in performance in the manner indicated.

All obvious substitutions, variants, and modifications as to materials, sequence of steps and/or rearrangement are intended to be included within the scope of the present invention unless clearly violative of the language of the appended claims.

I claim:

1. A liquid concentrate for addition to water systems recirculated in paint spray booths, which concentrate imparts to the water system, a capacity to convert paint overspray particles to a filterable, spongy mass; said concentrate comprising,
   (1) an amount of finely divided Kaolin clay,
   (2) at least an equal amount of water, by weight,
   (3) a minor amount of a liquid, rubbery substance, composed, essentially of gum Karaya, and
   (4) a minor amount of water-soluble oil.

2. The invention, as claimed in claim 1, which includes a minor amount of sodium Bentonite.

3. The invention, as claimed in claim 2, where the sodium Bentonite measures about 1.5 to 6.0 percent based upon Kaolin.

4. The invention, as claimed in claim 3, wherein the Bentonite is the Black Hills variety.

5. The invention, as claimed in claim 4, wherein the amount of water, on a weight basis, is about forty percent (40%) greater than that of the silicate.

6. The invention, as claimed in claim 5, wherein the Kaolin has a particle size such that about sixty percent (60%) is two (2) microns, or finer, and having a minimum of not more than about three-tenths percent (0.3%) retained on a 325 mesh screen.

7. The invention, as claimed in claim 6, wherein the water soluble oil measures about six-and-one-half percent ($6\frac{1}{2}$%).

8. The invention, as claimed in claim 3, wherein the water soluble oil measures about six-and-one-half percent ($6\frac{1}{2}$%).

9. The method of removing paint overspray particles from a circulating water system employed in paint spray booths, that method comprising the addition to the water system of an aqueous concentrate of Kaolin clay, liquid gum Karaya and water; said clay and water being in the form of a slurry concentrate added to the water system; said concentrate converting paint particles to a spongy filterable mass.

10. The method as claimed in claim 9 wherein the concentrate includes a minor amount of water soluble oil and a minor portion of the clay is Bentonite.

* * * * *